(12) United States Patent
Choi et al.

(10) Patent No.: US 12,512,578 B2
(45) Date of Patent: Dec. 30, 2025

(54) DISPLAY DEVICE

(71) Applicant: LG ELECTRONICS INC., Seoul (KR)

(72) Inventors: Hyunah Choi, Seoul (KR); Yongjin Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 172 days.

(21) Appl. No.: 18/553,156

(22) PCT Filed: Jun. 28, 2021

(86) PCT No.: PCT/KR2021/008101
§ 371 (c)(1),
(2) Date: Sep. 28, 2023

(87) PCT Pub. No.: WO2023/277202
PCT Pub. Date: Jan. 5, 2023

(65) Prior Publication Data
US 2024/0186677 A1    Jun. 6, 2024

(51) Int. Cl.
*H01Q 1/22*      (2006.01)
*H01Q 21/06*     (2006.01)
*H04N 7/06*      (2006.01)

(52) U.S. Cl.
CPC ............ *H01Q 1/22* (2013.01); *H01Q 21/065* (2013.01); *H04N 7/06* (2013.01)

(58) Field of Classification Search
CPC ........... H01Q 1/22; H01Q 21/065; H04N 7/06
See application file for complete search history.

(56) References Cited

U.S. PATENT DOCUMENTS 4,169,226 A * 9/1979 Fukuji ............... H03J 9/06
398/106
4,804,972 A * 2/1989 Schudel .............. H01Q 1/42
343/915

(Continued)

FOREIGN PATENT DOCUMENTS

KR   1020080018059    2/2008
KR   1020190132954   11/2019

(Continued)

OTHER PUBLICATIONS

PCT International Application No. PCT/KR2021/008101, International Search Report dated Mar. 21, 2022, 2 pages.

*Primary Examiner* — Michael B. Pierorazio
(74) *Attorney, Agent, or Firm* — LEE, HONG, DEGERMAN, KANG & WAIMEY

(57) ABSTRACT

An embodiment of the present invention comprises: a first antenna module which has a plurality of first antenna patches and a plurality of dipole antennas disposed on a first substrate and is closer to one end among one end and the other end of a display panel; and a second antenna module which has a plurality of second antenna patches and a plurality of monopole antennas disposed on a second substrate and is closer to the other end among one end and the other end of the display panel, wherein the first antenna module and the second antenna module are arranged under the display panel to be spaced a predetermined distance apart from each other in the left-and-right direction.

12 Claims, 5 Drawing Sheets

(56) References Cited

U.S. PATENT DOCUMENTS

| | | | | |
|---|---|---|---|---|
| 5,528,253 | A * | 6/1996 | Franklin | H01Q 1/427 343/872 |
| 6,023,242 | A * | 2/2000 | Dixon | H01Q 3/26 342/359 |
| 6,072,440 | A * | 6/2000 | Bowman | H01Q 1/42 343/872 |
| 6,538,612 | B1 * | 3/2003 | King | H01Q 1/3275 343/765 |
| 6,710,749 | B2 * | 3/2004 | King | H01Q 1/125 343/765 |
| 6,832,070 | B1 * | 12/2004 | Perry | H04N 21/4782 348/E7.06 |
| 6,864,846 | B2 * | 3/2005 | King | H01Q 3/08 343/765 |
| 6,904,609 | B1 * | 6/2005 | Pietraszak | H04N 21/47 725/39 |
| 6,937,199 | B2 * | 8/2005 | King | H01Q 3/04 342/359 |
| 7,075,492 | B1 * | 7/2006 | Chen | H01Q 19/134 343/781 R |
| 7,076,202 | B1 * | 7/2006 | Billmaier | H04N 21/4334 455/66.1 |
| 7,239,274 | B2 * | 7/2007 | Lee | H01Q 1/3275 342/359 |
| 7,301,505 | B2 * | 11/2007 | King | H01Q 3/005 343/765 |
| 7,472,409 | B1 * | 12/2008 | Linton | H01Q 3/08 343/705 |
| 7,484,233 | B2 * | 1/2009 | Pietraszak | H04N 21/84 725/39 |
| 7,603,687 | B2 * | 10/2009 | Pietraszak | H04N 21/4782 725/50 |
| 7,679,573 | B2 * | 3/2010 | Shuster | H01Q 1/273 343/766 |
| 7,685,621 | B2 * | 3/2010 | Matsuo | H04N 21/4622 725/38 |
| 8,077,113 | B2 * | 12/2011 | Syed | H01Q 17/00 343/912 |
| 8,269,901 | B2 * | 9/2012 | Yi | H03J 7/186 348/731 |
| 8,368,611 | B2 * | 2/2013 | King | H01Q 3/08 725/63 |
| 8,487,813 | B2 * | 7/2013 | Leiba | H01Q 1/1257 342/359 |
| 8,836,597 | B1 * | 9/2014 | Vizzio | H01P 1/066 343/765 |
| 10,476,153 | B2 * | 11/2019 | Anderson | H01Q 3/08 |
| 10,923,812 | B1 * | 2/2021 | Schwartz | H01Q 1/42 |
| 2003/0017852 | A1 * | 1/2003 | Miyatani | H01Q 3/2605 455/562.1 |
| 2003/0051246 | A1 * | 3/2003 | Wilder | H04N 7/17318 348/E7.071 |
| 2003/0080898 | A1 * | 5/2003 | Wang | H01Q 1/42 342/359 |
| 2003/0214449 | A1 * | 11/2003 | King | H01Q 3/08 343/765 |
| 2004/0128689 | A1 * | 7/2004 | Pugel | H04N 5/50 725/39 |
| 2004/0160375 | A1 * | 8/2004 | King | H01Q 3/005 343/765 |
| 2004/0166811 | A1 * | 8/2004 | Moon | H04B 17/318 455/67.11 |
| 2004/0227655 | A1 * | 11/2004 | King | H01Q 1/3275 341/176 |
| 2005/0108751 | A1 * | 5/2005 | Dacosta | H04N 21/4135 348/E5.103 |
| 2005/0193415 | A1 * | 9/2005 | Ikeda | H04N 21/4586 725/50 |
| 2005/0225495 | A1 * | 10/2005 | King | H01Q 19/132 343/840 |
| 2006/0020978 | A1 * | 1/2006 | Miyagawa | H04B 17/27 725/72 |
| 2006/0139499 | A1 * | 6/2006 | Onomatsu | H04N 21/485 348/731 |
| 2006/0170603 | A1 * | 8/2006 | King | H01Q 19/10 343/765 |
| 2006/0187117 | A1 * | 8/2006 | Lee | H01Q 1/1257 342/359 |
| 2007/0152897 | A1 * | 7/2007 | Zimmerman | H01Q 1/28 343/757 |
| 2008/0048919 | A1 * | 2/2008 | Jung | H01Q 1/2266 343/893 |
| 2008/0129885 | A1 * | 6/2008 | Yi | H04N 21/4263 348/731 |
| 2008/0136722 | A1 * | 6/2008 | King | H01Q 1/42 342/359 |
| 2008/0186242 | A1 * | 8/2008 | Shuster | H01Q 3/08 343/762 |
| 2008/0186409 | A1 * | 8/2008 | Kang | H04N 21/426 348/731 |
| 2008/0246677 | A1 * | 10/2008 | Shuster | H01Q 19/17 343/766 |
| 2009/0135309 | A1 * | 5/2009 | DeGeorge | H04N 21/4345 348/732 |
| 2009/0260038 | A1 * | 10/2009 | Acton | H04N 21/482 725/49 |
| 2009/0310030 | A1 * | 12/2009 | Litwin | H04N 21/4345 348/731 |
| 2010/0214482 | A1 * | 8/2010 | Kang | H04N 5/50 348/731 |
| 2010/0315307 | A1 * | 12/2010 | Syed | H01Q 17/00 343/872 |
| 2011/0126232 | A1 * | 5/2011 | Lee | H04N 21/6405 707/E17.049 |
| 2012/0262351 | A1 * | 10/2012 | Hamabe | H01Q 21/28 343/727 |
| 2013/0207868 | A1 * | 8/2013 | Venghaus | H01Q 19/12 343/840 |
| 2014/0266937 | A1 | 9/2014 | Mahanfar et al. | |
| 2016/0104942 | A1 * | 4/2016 | Pera | H01Q 1/246 343/836 |
| 2016/0359224 | A1 * | 12/2016 | Mellor | H01Q 3/06 |
| 2017/0179592 | A1 * | 6/2017 | Anderson | H04W 24/02 |
| 2019/0207303 | A1 * | 7/2019 | Porter | H01Q 1/42 |
| 2019/0237850 | A1 * | 8/2019 | Fleischer | H01Q 3/02 |
| 2019/0372229 | A1 | 12/2019 | Dalmia et al. | |
| 2021/0066780 | A1 * | 3/2021 | Fleischer | H04W 48/20 |
| 2021/0096515 | A1 * | 4/2021 | Ruaro | G04G 21/04 |
| 2021/0126344 | A1 | 4/2021 | Jeon | |
| 2021/0141584 | A1 | 5/2021 | Seo et al. | |
| 2021/0320414 | A1 | 10/2021 | Kim et al. | |

FOREIGN PATENT DOCUMENTS

| | | |
|---|---|---|
| KR | 1020200024408 | 3/2020 |
| KR | 102132054 | 7/2020 |
| KR | 1020200123150 | 10/2020 |
| KR | 1020210048342 | 5/2021 |

* cited by examiner

[FIG. 1]
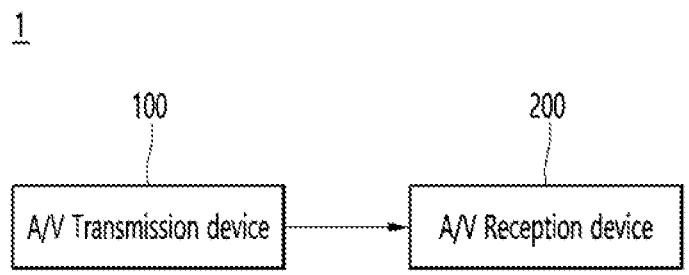
[FIG. 2]
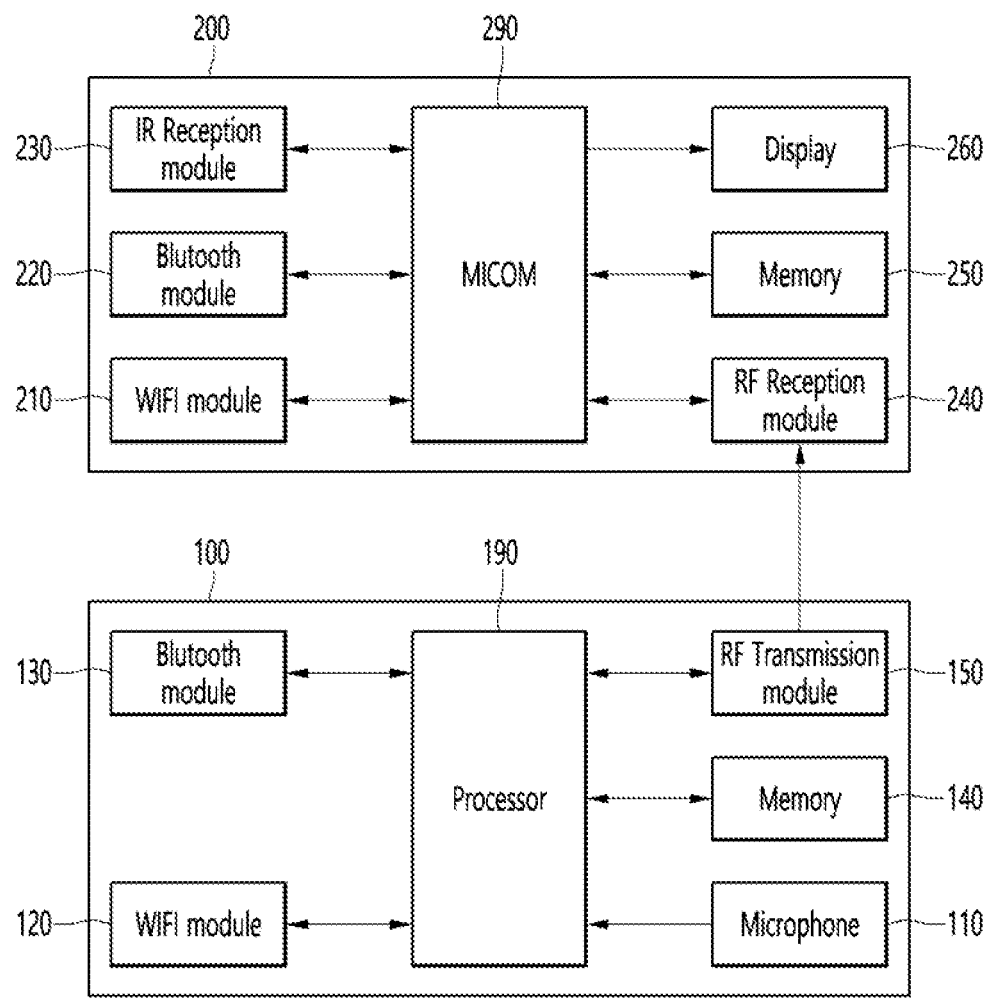

[FIG. 3]
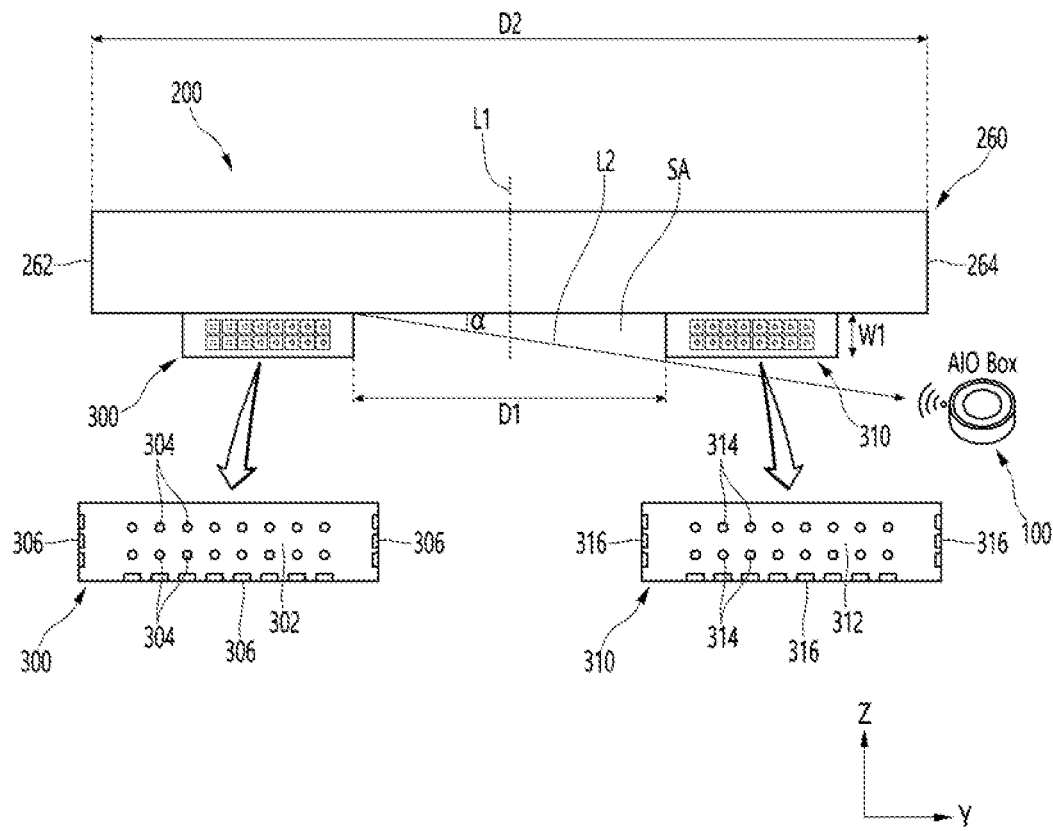
[FIG. 4]
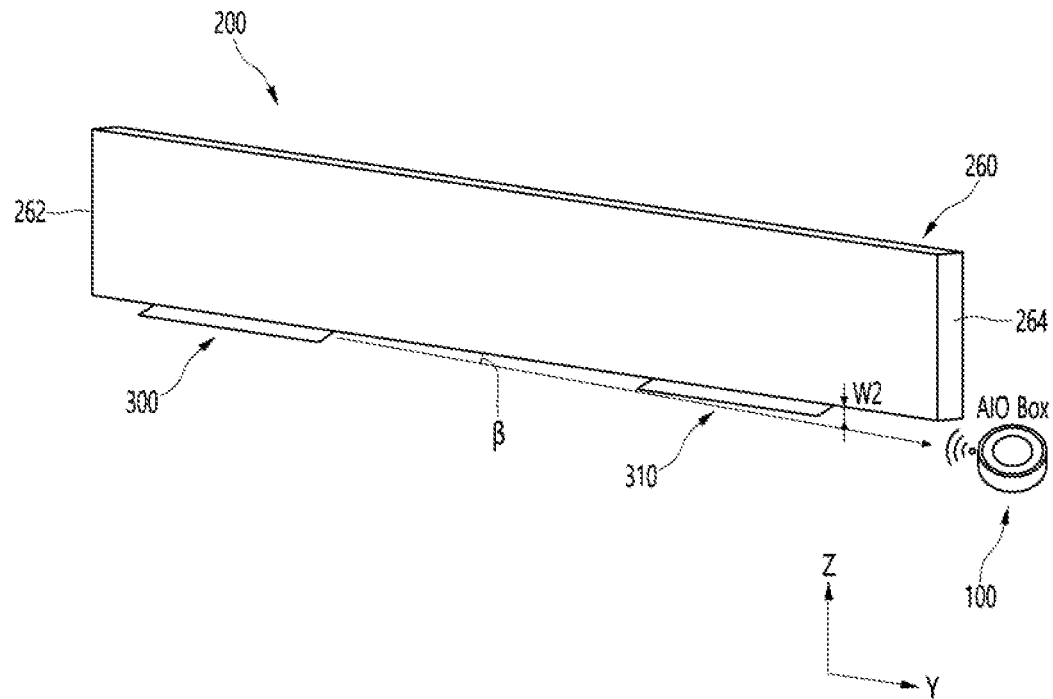

[FIG. 5]
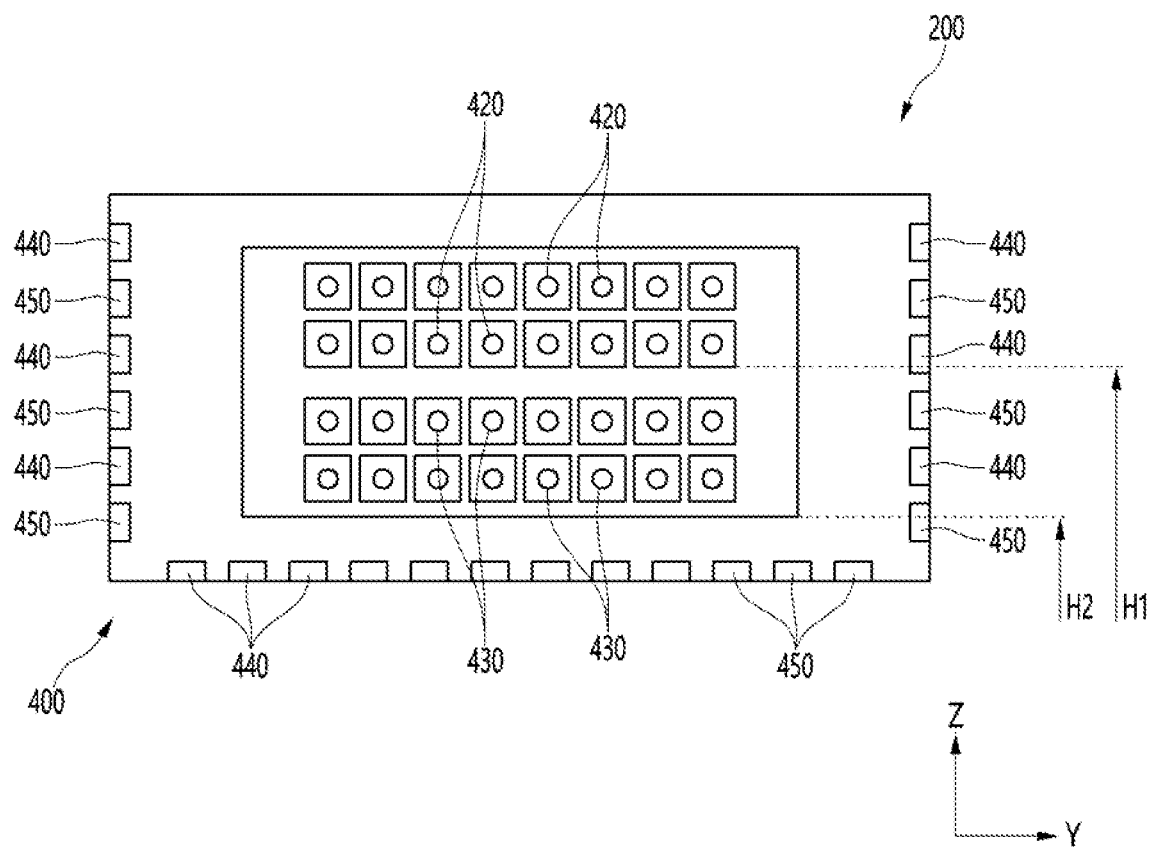
[FIG. 6]
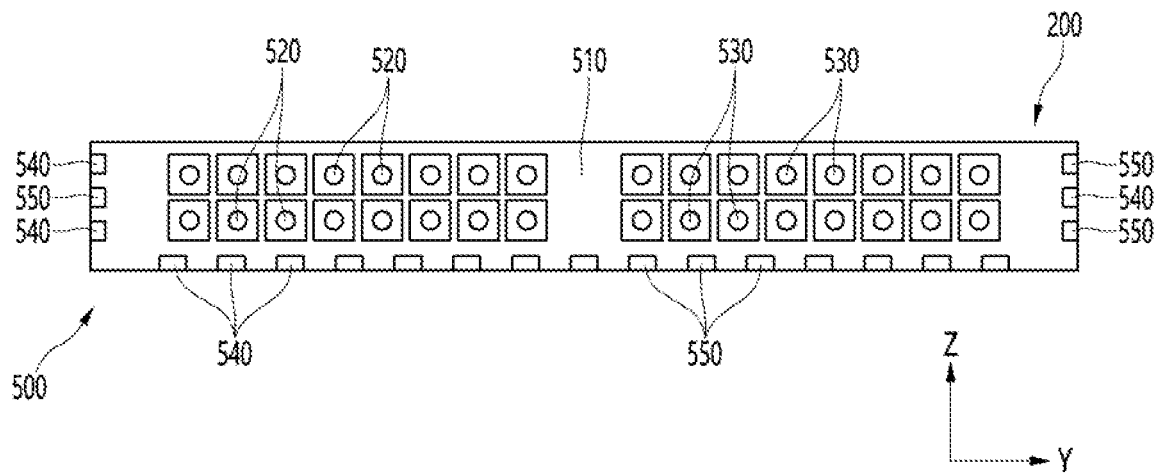

[FIG. 7]
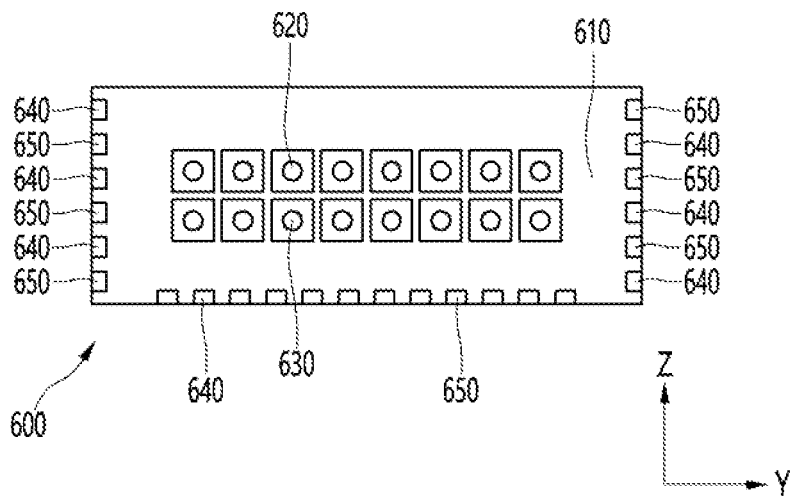
[FIG. 8]
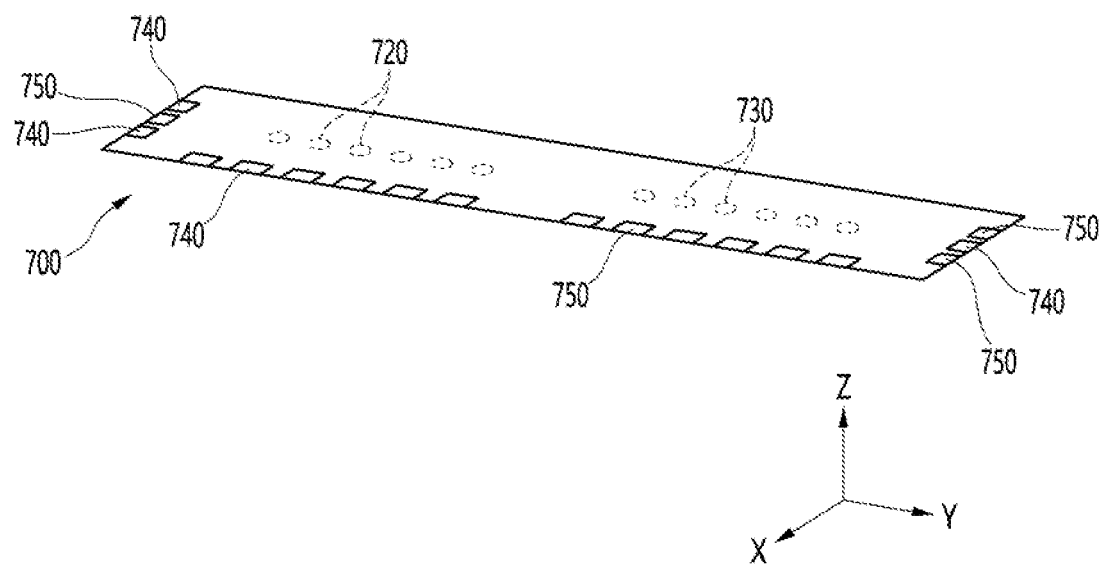

[FIG. 9]
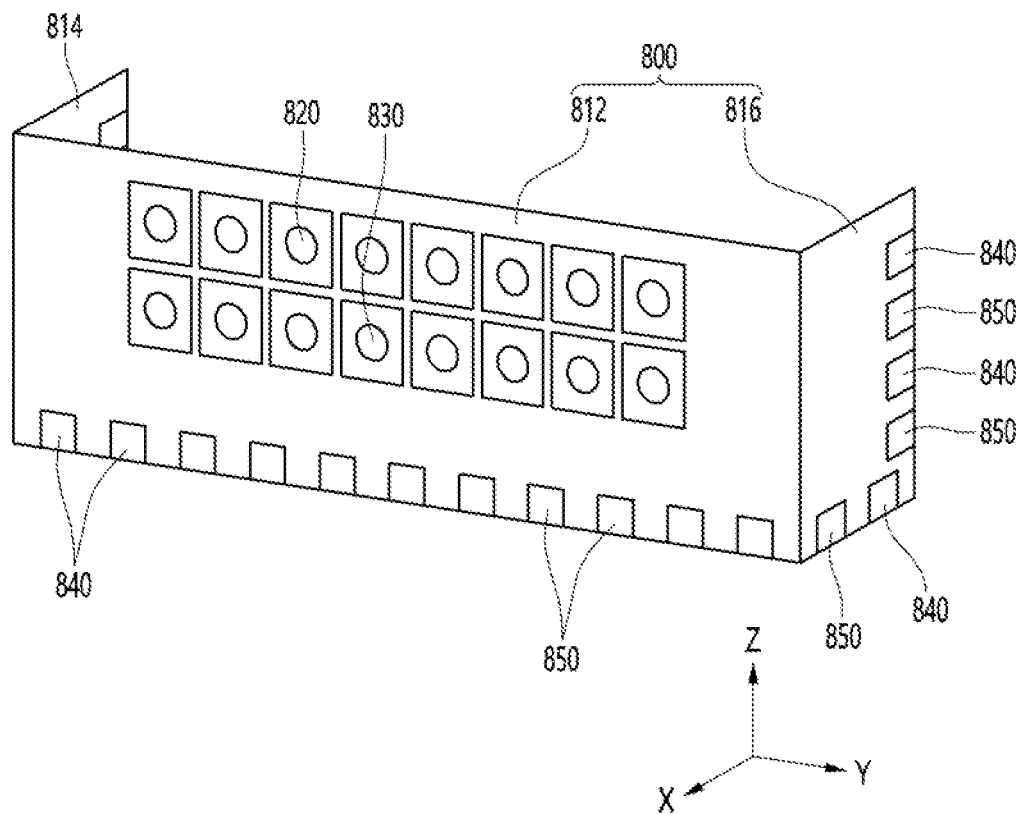
[FIG. 10]
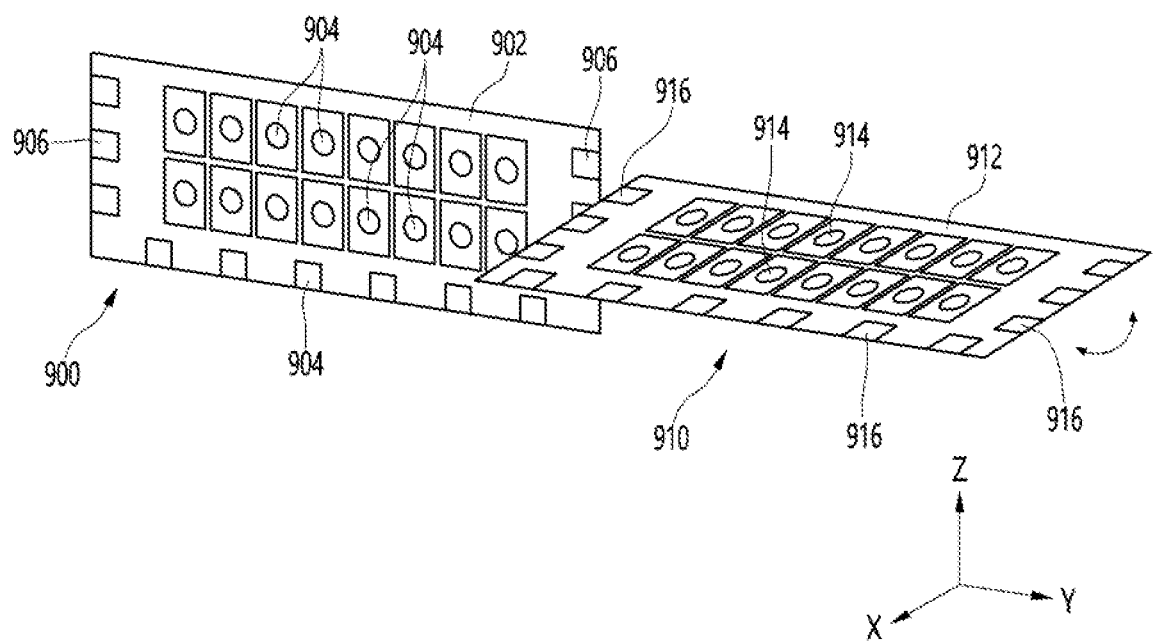

DISPLAY DEVICE

CROSS-REFERENCE TO RELATED APPLICATION(S)

This application is the National Stage filing under 35 U.S.C. 371 of International Application No. PCT/KR2021/008101, filed on Jun. 28, 2021, the contents of which are all incorporated by reference herein in its entirety.

TECHNICAL FIELD

The present disclosure relates to a display device, and more particularly, to a display device having an antenna module for wirelessly receiving data.

BACKGROUND ART

As imaging technologies have advanced from standard-definition (SD) to Hi-definition (HD) to provide an image closer to an actual screen while changing from analog to digital. The SD supports a resolution of 704×480 and is constituted by about 350,000 pixels, and the HD is divided into HD and full HD. The full HD supports a resolution of 1920×1080 and is constituted by 2 million pixels to provide a considerable high-quality image compared to the SD.

In recent, imaging technologies are further growing one step from the full HD to ultra high-definition (UHD), and the UHD, which supports the ultra-high definition and the ultra-high resolution, is in the spotlight as a next-generation media environment. The UHD supports resolutions of 4K (3840×2160) and 8K (7680×4320) and supports surround audio having up to 22.2 channels. Such the UHD provides 4 times clearer picture quality compared to the HD even on the basis of 4K UHD, and 8K UHD provides 16 times clearer picture quality compared to the HD.

Recently, a wireless display system that wirelessly transmits such a high-resolution image to a display device has appeared.

The wireless display system is a system that transmits and receives A/V data between an A/V transmission device and an A/V reception device through a local area network.

The A/V reception device displays A/V data received from the A/V transmission device.

An example of the A/V transmission device may be a transmission box having an antenna module that wirelessly transmits the A/V data.

An example of the A/V reception device may be a display device having an antenna module for receiving the A/V data transmitted from the A/V transmission device and outputting the received A/V data.

The display device may include a pair of antenna modules and an IR module disposed between the pair of antenna modules, and the pair of antenna modules may be spaced apart from each other in a left and right direction.

In the wireless display system, the antenna module of the A/V transmission device may be disposed at a left or right side of the display device, and in this case, the pair of antenna modules provided in the display device may transmit data transmitted from the antenna module of the A/V transmission device and may be received in a two-stream method, and the display device may output an image.

When the A/V transmission device is disposed at the left or right side of the display device, one module of the pair of antenna modules of the display device may not receive data because a signal is blocked by the IR module, and the display device may operate as one stream.

When operating with one stream, a compression rate has to be twice as high as when operating with two streams to transmit and receive the data at the same level as in the case of the two streams. However, if the compression rate increases, an image quality level may be deteriorated.

DISCLOSURE OF THE INVENTION

Technical Problem

An object of the present invention is to provide a display device capable of transmitting two streams of data regardless of a position of an A/V transmission device.

Technical Solution

This embodiment includes a first antenna module in which a plurality of first antenna patches and a plurality of dipole antennas are disposed on a first substrate and which is closer to one end of the display panel, and a second antenna module in which a plurality of second antenna patches and a plurality of monopole antennas are disposed on a second substrate and which is closer to the other end of the display panel, wherein the first antenna module and the second antenna module are disposed to be spaced a set distance from each other below the display panel in a left and right direction.

The first antenna module and the second antenna module may be vertically disposed below the display panel.

The set distance may be 70 mm or more and be less than a width of the display panel in the left and right direction.

Another embodiment may include: a substrate; a plurality of first antenna patches and a plurality of second antenna patches, which are disposed together on one surface of the substrate; and a dipole antenna and a monopole antennas, which are closer to an edge of a center and the edge of the substrate.

Each of the plurality of first antenna patches may have a height greater than a height of each of the plurality of second antenna patches.

The plurality of first antenna patches and the plurality of second antenna patches may be spaced apart from each other in a horizontal direction.

The plurality of first antenna patches and the plurality of second antenna patches may be disposed in a row in the horizontal direction, and the plurality of first antenna patches and the plurality of second antenna patches may be spaced apart from each other in a vertical direction.

The substrate may be disposed vertically, and the plurality of first antenna patches and the plurality of second antenna patches may be disposed on a front surface of the substrate.

The substrate may be disposed horizontally, and the plurality of first antenna patches and the plurality of second antenna patches may be disposed on a bottom surface of the substrate.

Further another embodiment may include: a substrate comprising a main body, a first side body disposed at one side of the main body, and a second side body disposed at the other side of the main body; a plurality of first antenna patches and a plurality of second antenna patches, which are disposed on one surface of the main body; and a dipole antenna and a monopole antenna, which are disposed on the substrate, wherein the dipole antenna and the monopole antenna may be disposed on the main body and the first and second side bodies, respectively.

The first side body and the second side body may face each other.

The substrate may be a flexible PCB.

Advantageous Effects

In the display device according to this embodiment both the first antenna module and the second antenna module may smoothly receive the data regardless of the position of the A/V transmission device.

In addition, the A/V transmission device may transmit the two streams of the data, and the deterioration in image quality that occurs when the data compression rate increases may be minimized.

In addition, since the horizontally polarized antenna and the vertically polarized antenna may be disposed together on one substrate, the antenna module may be compacted and have the high data reception rate.

BRIEF DESCRIPTION OF THE DRAWINGS

FIG. 1 is a view for explaining a configuration of a display system according to this embodiment, FIG. 2 is a block diagram for explaining a detailed configuration of an A/V transmission device and an A/V reception device, FIG. 3 is a perspective view illustrating a first example of a display device according to this embodiment, FIG. 4 is a view illustrating a modified example of the first example of the display device according to this embodiment, FIG. 5 is a front view illustrating a second example of the display device according to this embodiment, FIG. 6 is a front view illustrating a third example of the display device according to this embodiment, FIG. 7 is a view illustrating a fourth example of the display device according to this embodiment, FIG. 8 is a perspective view illustrating a fifth example of the display device according to this embodiment, FIG. 9 is a perspective view illustrating a sixth example of the display device according to this embodiment, FIG. 10 is a perspective view illustrating a seventh example of the display device according to this embodiment.

MODE FOR CARRYING OUT THE INVENTION

Hereinafter, detailed embodiments will be described in detail with reference to the accompanying drawings.

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A video/audio (hereinafter, referred to as A/V) transmission device according to an embodiment of the present disclosure may be an intelligent device in which a computer support function is added to a broadcast reception function, and thus, since the Internet function and the like are added while being faithful to the broadcast reception function, the A/V transmission device may be equipped with a more user-friendly interface such as a handwriting type input device, a touch screen, or a space remote controller, and the like.

In addition, the A/V transmission device may be connected to the Internet and the computer by supporting a wired or wireless Internet function to perform functions such as E-mail, Web browsing, banking, or games. A standardized universal OS may be used for these various functions.

Therefore, since various applications is freely added or deleted on the A/V transmission device described in the present disclosure, for example, on the universal OS kernel, various user-friendly functions may be performed.

FIG. 1 is a view for explaining a configuration of a display system according to this embodiment.

Referring to FIG. 1, a wireless display system 1 according to this embodiment includes an A/V transmission device 100 and an A/V reception device 200.

The wireless display system 1 may be a system in which the A/V transmission device 100 wirelessly transmits A/V data to the A/V reception device 200, and the A/V reception device 200 transmits the A/V data.

The A/V transmission device 100 may be a device capable of encoding video and audio and wirelessly transmitting the encoded content video and audio.

An example of the A/V transmission device 100 may be an All In One (AIO) box capable of transmitting data and may be, for example, a set-top box.

Another example of the A/V transmission device 100 may be connected to an external device such as the set-top box or a USB memory. The A/V transmission device 100 may transmit a video signal or an audio signal received from the connected external device to the A/V reception device 200.

The A/V reception device 200 may be a display device capable of wirelessly receiving encoded video and audio and decoding the received video and audio.

The A/V transmission device 100 and the A/V reception device 200 may constitute a video wall display system.

In the video wall, a display with a thin bezel plays an important role in visualizing content images. For the thin bezel of the display, it is efficient to have only a component capable of playing the minimum role and to perform a circuit or component for a main function in a separate device.

The A/V transmission device 100 may determine the type of content video to determine a compression rate of the content video based on the determined type. The compression rate of the content video may be defined as a ratio of a size of video data before encoding to the size of the video data after encoding.

The type of content video may include a still video type, a general video type, and a game video type.

The A/V transmission device 100 may compress the content video according to the determined compression rate and wirelessly transmit the compressed content video to the A/V reception device 200.

The A/V reception device 200 may restore the compressed content image received from the A/V transmission device 100 and display the restored content image on the display, for example, the display device.

FIG. 2 is. for explaining a detailed configuration of the A/V transmission device 100 and the A/V reception device 200.

Referring to FIG. 2, the A/V transmission device 100 may include a microphone 110, a Wi-Fi module 120, a Bluetooth module 130, a memory 140, an RF transmission module 150, and a processor 190.

The microphone 110 may receive an audio signal to transmit the received audio signal to the processor 190.

The microphone 110 may receive a voice uttered by a user.

The Wi-Fi module 120 may perform wireless communication through a Wi-Fi standard. The Wi-Fi module 120 may perform wireless communication with the external device or the A/V reception device 200 through the Wi-Fi standard.

The Bluetooth module 130 may perform wireless communication through the Bluetooth low energy (BLE) standard.

The Bluetooth module 130 may perform wireless communication with the external device such as a remote controller or the A/V reception device 200 through the Bluetooth low energy (BLE) standard.

The memory 140 may store program for processing and controlling signals and may store signal-processed video, audio, or data signals.

The memory 140 may perform a function for temporarily storing video, audio, or data signals input from the outside and may store information about a predetermined image through a channel storage function.

The RF transmission module 150 may transmit an A/V signal to the RF reception module 240 of the A/V reception device 200 through radio frequency (RF) communication.

The RF transmission module 150 may transmit an compressed A/V signal, which is in the form of digital, to the RF reception module 240.

The RF transmission module 150 may transmit the A/V signal to the RF reception module 240 through one or more channels.

The processor 190 may control an overall operation of the A/V transmission device 100. The processor 190 may be configured in the form of a system on chip (SoC).

The processor 190 may be provided in plurality.

The processor 190 may compress a video signal or an audio signal input from the outside and transmit the compressed signal to the RF transmission module 150.

The processor 190 may include an encoder for compressing the video signal or the audio signal.

The processor 190 may be referred to as a main SoC.

The processor 190 may have one or more interfaces for connection with the external device. For example, the processor 190 may have one or more HDMI ports and one or more USB ports.

The processor 190 may include a tuner that receives broadcast signals.

The A/V reception device 200 may include a Wi-Fi module 210, a Bluetooth module 220, an IR module 230, an RF reception module 240, a memory 250, a display 260, and a MICOM 290.

The Wi-Fi module 210 may perform wireless communication through a Wi-Fi standard.

The Wi-Fi module 120 may perform wireless communication with the external device or the A/V transmission device 100 through the Wi-Fi standard.

The Bluetooth module 220 may perform wireless communication through the Bluetooth low energy (BLE) standard.

The Bluetooth module 220 may perform wireless communication with the external device such as the remote controller or the A/V transmission device 200 through Bluetooth low energy (BLE) standard.

The IR module 230 may receive a signal from the remote controller (not shown) through IR (infrared) communication.

The RF reception module 240 may receive the A/V signal from the RF transmission module 150.

The RF reception module 240 may include a plurality of antennas. The RF reception module 240 may be disposed below the display 260.

An example of the RF reception module 240 may include a first antenna module and a second antenna module. Each of the first antenna module and the second antenna module may include a plurality of antennas.

Another example of the RF reception module 240 may include one antenna module, and the antenna module may include a plurality of antennas.

The RF reception module 240 may receive the digital compressed A/V signal from the RF transmission module 150 and transfer the received A/V signal to the MICOM 290.

The memory 250 may store program for processing and controlling signals and may store signal-processed video, audio, or data signals.

The display 260 may be a display panel 260 capable of displaying an image signal received from the MICOM 290. An example of such a display panel 260 may be an LED panel.

The display panel 260 may display the image signal according to driving of a timing controller (not shown).

The MICOM 290 may control an overall operation of the display device 200.

The MICOM 290 may restore the compressed A/V signal received by the RF reception module 240. For this, the MICOM 290 may include a decoder.

Hereinafter, the A/V reception device 200 may be the display device, and the same reference numerals as the A/V reception device will be used for description of the display device.

FIG. 3 is a perspective view illustrating a first example of the display device according to this embodiment.

The display device 200 may include a display panel 260, a first antenna module 300, and a second antenna module 310.

Each of the first antenna module 300 and the second antenna module 310 may include 16 antennas, but this is merely an example.

The first antenna module 300 and the second antenna module 310 may be disposed below the display panel 260.

Each of the antennas provided in the first antenna module 300 may have a horizontally polarized property. In the first antenna module 300, a plurality of first antenna patches 304 and a plurality of dipole antennas 306 may be disposed on a first substrate 302.

The first substrate 302 may be vertically disposed. A length of the first substrate 302 in a left and right direction Y may be greater than that in a vertical direction Z. Like a front surface of the display panel 260, a front surface of the first substrate 302 may face forward.

As illustrated in FIG. 3, the plurality of first antenna patches 304 may be arranged in a row in the horizontal direction and may be arranged in a plurality of rows in the vertical direction Z.

The plurality of first antenna patches 304 may be disposed on a front surface of the first substrate 302.

When a length of the antenna is less than ½ of a used wavelength, the dipole antenna 306 may be an antenna that acts like a dipole because a polarity of vertical or left-right linear potential distribution is always reversed with respect to a center of the antenna.

The plurality of dipole antennas 306 may be provided on the first substrate 302.

The plurality of dipole antennas 306 may be disposed closer to an edge of the center and the edge of the first substrate 302.

The plurality of dipole antennas 306 may include a plurality of left dipole antennas disposed at a left end of the first substrate 302, a plurality of lower dipole antennas disposed at a lower end of the first substrate 302, and a plurality of right dipole antennas disposed at a right end of the first substrate 302.

The first antenna module 300 may be closer to one end 262 of the display panel 260. The first antenna module 300 may be a right antenna module closer to a right end of the display panel 240. The first antenna module 300 may be disposed to be biased toward a right side of the display device 20.

The first antenna module 300 may further include a first cover (not shown) covering the first substrate 302, the plurality of first antenna patches 304, and the plurality of dipole antennas 306. The first substrate 302, the plurality of first antenna patches 304, and the plurality of dipole antennas 306 may be disposed inside the first cover and may be protected by the first cover.

Each of the antennas provided in the second antenna module 310 may have a vertically polarized property. In the second antenna module 310, a plurality of second antenna patches 314 and a plurality of monopole antennas 316 may be disposed on the second substrate 312.

The second substrate 312 may be vertically disposed. A length of the second substrate 312 in the left and right direction Y may be greater than that in the vertical direction Z. Like the front surface of the display panel 260, a front surface of the second substrate 312 may face forward.

As illustrated in FIG. 3, the plurality of second antenna patches 314 may be arranged in a row in the horizontal direction and may be arranged in a plurality of rows in the vertical direction Z.

The plurality of second antenna patches 314 may be disposed on the front surface of the second substrate 312.

The monopole antenna 316 is an antenna having a vertical straight or spiral conductor that operates as a half of the dipole antenna.

The monopole antenna 316 may be provided in plurality on the second substrate 312.

The plurality of monopole antennas 316 may be disposed closer to a center of an edge and at the edge of the second substrate 312.

The plurality of monopole antennas 316 may include a plurality of left monopole antennas disposed at a left end of the second substrate 312, a plurality of lower monopole antennas disposed at a lower end of the second substrate 312, and a plurality of right monopole antennas disposed at a right end of the second substrate 312.

The second antenna module 310 may be closer to the other end 264 of the display panel 260. The second antenna module 310 may be a right left antenna module closer to a left end of the display panel 240. The second antenna module 310 may be disposed to be biased toward a left side of the display device 20.

The second antenna module 310 may further include a second cover (not shown) covering the second substrate 312, the plurality of second antenna patches 314, and the plurality of monopole antennas 316. The second substrate 312, the plurality of second antenna patches 314, and the plurality of monopole antennas 316 may be disposed inside the second cover and may be protected by the second cover.

As illustrated in FIG. 3, a space may be formed between the first antenna module 300 and the second antenna module 310.

The IR module 230 (see FIG. 2) may not be disposed in the space between the first antenna module 300 and the second antenna module 310, and the first antenna module 300 and the second antenna module 310 may have an empty space therebetween.

An extension line L1 of a center line dividing the display panel 260 to left and right portions may pass through the empty space between the first antenna module 300 and the second antenna module 310.

The first antenna module 300 and the second antenna module 310 may be spaced a set distance D1 from each other in the left and right direction Y.

The first antenna module 300 and the second antenna module 310 may be vertically disposed below the display panel 260. A vertical width W1 of each of the first antenna module 300 and the second antenna module 310 may be 1 cm to 2 cm, for example, 1.5 cm. At least one of the first antenna module 300 or the second antenna module 310 may be rotatably disposed.

As illustrated in FIG. 3, the A/V transmission device 100 may be disposed at the left or right side of the display device 200, and a shaded area (SA) in which data transmitted from the A/V transmission device 100 is not received may be formed between the first antenna module 300 and the second antenna module 310.

Any one 310 of the first antenna module 300 and the second antenna module 310 may be a proximity antenna 310 closer to the A/V transmission device 100, and the other 300 of the first antenna module 300 and the second antenna modules 310 may be a non-proximity antenna 300.

An extension line L2 of a virtual line connecting vertexes of the A/V transmission device 100 and the proximity antenna 310 to each other and a lower end of the display panel 260 may have a predetermined shade angle α.

The shaded area SA may be defined as an area between the extension line L2 of the virtual line and the lower end of the display panel 260.

It is preferable that the non-proximity antenna module 300 is not disposed on the shaded area SA as much as possible.

It is preferable that the first antenna module 300 and the second antenna module 310 are spaced an appropriate distance or more from each other so that the non-proximity antenna module 300 is not disposed on the shaded area SA as much as possible.

The set distance D1 may be equal to or greater than 70 mm, and the set distance D may be less than the horizontal width D2 of the display panel 260.

When the set distance D1 between the first antenna module 300 and the second antenna module 310 is 70 mm or more, the first antenna module 300 and the second antenna module 310 have a maximum shaded area SA, and the shade angle α may be minimized so that a reception area is widened.

FIG. 4 is a view illustrating a modified example of the first example of the display device according to this embodiment.

The first antenna module 300 and the second antenna module 310 may be disposed horizontally or inclined at a predetermined angle β below the display panel 260.

When the first antenna module 300 and the second antenna module 310 are horizontally disposed, front ends of the first antenna module 300 and the second antenna module 310 may face forward.

When the first antenna module 300 and the second antenna module 310 are inclined, the first antenna module 300 and the second antenna module 310 may be inclined to a front lower side. The lower ends of the first antenna module 300 and the second antenna module 310 may face the front lower side of the display panel 260.

When the first antenna module 300 and the second antenna module 310 are disposed below the display panel 260 at a predetermined angle β, a vertical width W2 of each of the first antenna module 300 and the second antenna module 310 may be 0.5 cm to 1.5 cm, for example, 1 cm.

Configurations other than the disposition directions of the first antenna module 300 and the second antenna module 310 are the same as or similar to those of the first example of the display device illustrated in FIG. 3, and detailed descriptions thereof are omitted.

FIG. 5 is a front view illustrating a second example of the display device according to this embodiment.

A display device of this embodiment may include an antenna module 400.

The antenna module 400 may include both a horizontally polarized antenna and a vertically polarized antenna. The antenna module 400 may be disposed at a center of a lower portion of the display device.

The antenna module 400 may include: a substrate 410; a plurality of first antenna patches 420; a plurality of second antenna patches 430; a dipole antenna 440; and a monopole antenna 450.

The antenna module 400 may further include a cover (not shown), and the cover may protect the substrate 410; the plurality of first antenna patches 420; the plurality of second antenna patches 430; the dipole antenna 440; and the monopole antenna 450.

The substrate 410 may be assembled to be vertically disposed on the display device.

The plurality of first antenna patches 420 and the plurality of first antenna patches 430 may be disposed together on one surface of the substrate 410.

When the substrate 410 is vertically disposed, the plurality of first antenna patches 420 and the plurality of second antenna patches 430 may be disposed together on a front surface of the substrate 410.

The plurality of first antenna patches 420 and the plurality of second antenna patches 430 may be provided at a center of the center and an edge of the substrate 410.

The substrate 410 may be defined by an edge area close to the edge and a central area inside the edge area, and the plurality of first antenna patches 420 and the plurality of second antenna patches 430 may be disposed together on the central area of the substrate 410.

The antenna module 400 may be a vertically stacked antenna module in which the first antenna patch 420 and the second antenna patch 430 are stacked in the vertical direction Z.

When the first antenna patch 420 and the second antenna patch 430 are stacked in the vertical direction Z, an example of the substrate 410 may have a horizontal length of 50 mm or less and a vertical length of 25 mm or more.

A height H1 of each of the plurality of first antenna patches 420 may be higher than a height H2 of each of the plurality of second antenna patches 430.

The plurality of first antenna patches 420 and the plurality of second antenna patches 430 may be spaced apart from each other in the vertical direction Z.

The lowest height of the plurality of first antenna patches 420 may be higher than the highest height of the plurality of second antenna patches 430.

The plurality of first antenna patches 420 may be arranged in a row in the horizontal direction, and may be arranged in a plurality of rows in the vertical direction Z. The plurality of first antenna patches 420 may include an upper row first antenna patch close to an upper end of the upper end and a center of the substrate 410 and a lower row first antenna patch close to the center of the upper end and the center of the substrate 410.

The upper row first antenna patch and the lower row first antenna patch may be spaced apart from each other in the vertical direction Z.

The plurality of second antenna patches 430 may be arranged in a row in the horizontal direction, and may be arranged in a plurality of rows in the vertical direction Z. The plurality of second antenna patches 430 may include an upper row second antenna patch close to the center of the center and a lower end of the substrate 410 and a lower row second antenna patch close to the lower end of the center and the lower end of the substrate 410.

The upper row second antenna patch and the lower row second antenna patch may be spaced apart from each other in the vertical direction Z.

When the plurality of first antenna patches 420 are in two rows, and the plurality of second antenna patches 430 are in two rows, a lower row of the first antenna patches 420 may be disposed to be spaced apart from an upper row of the second antenna patches 430 in the vertical direction Z.

The first antenna patch 420 may be the same as the first antenna patch 304 illustrated in FIG. 3, and the second antenna patch 430 may be the same as the second antenna patch 314 illustrated in FIG. 3.

Each of the dipole antenna 440 and the monopole antenna 450 may be provided in plurality on the substrate 410.

The plurality of dipole antennas 440 and the plurality of monopole antennas 450 may be disposed closer to the edge of the center and the edge of the substrate 410. The plurality of dipole antennas 440 and the plurality of monopole antennas 450 may be disposed together on the edge area of the substrate 410.

The plurality of dipole antennas 440 and the plurality of monopole antennas 450 may be disposed to be distributed to a left edge area, a lower edge area, and a right edge area of the substrate 410.

FIG. 6 is a front view illustrating a third example of the display device according to this embodiment.

The display device 200 of this embodiment may include an antenna module 500.

The antenna module 500 may include: a substrate 510; a plurality of first antenna patches 520; a plurality of second antenna patches 530; a dipole antenna 540; and a monopole antenna 550, and the plurality of first antenna patches 520 and the plurality of second antenna patches 530 may be spaced apart from each other in a horizontal direction.

The substrate 510 may be assembled to be vertically disposed on the display device 200.

The plurality of first antenna patches 520 and the plurality of second antenna patches 530 may be disposed together on one surface of the substrate 510. When the substrate 510 is vertically disposed, the plurality of first antenna patches 520 and the plurality of second antenna patches 530 may be disposed together on a front surface of the substrate 510.

The plurality of first antenna patches 520 and the plurality of second antenna patches 530 may be spaced apart from each other in the horizontal direction. The plurality of first antenna patches 520 and the plurality of second antenna patches 530 may be spaced apart from each other in the left and right direction Y.

Each of the plurality of first antenna patches 520 and the plurality of second antenna patches 530 may be disposed to be biased to left and right sides on a front central area of the substrate 410. For example, the plurality of first antenna patches 520 may be disposed to be biased to the right side at the right side of the front central area of the front surface of the substrate 410, and the plurality of second antenna patches 530 may be disposed to be biased to the left side at the left side of the front central area of the substrate 410.

The antenna module 500 may be a left-right stacked antenna module in which the plurality of first antenna patches 520 and the plurality of second antenna patches 530 are stacked in the left and right direction Y. A height of each of the plurality of first antenna patches 520 may be the same as that of each of the plurality of second antenna patches 530.

When the plurality of first antenna patches 520 and the plurality of second antenna patches 530 are stacked on the substrate 510 in the left and right direction Y, an example of the substrate 510 may have a horizontal length of 80 mm or more, and a vertical length within 20 mm.

The plurality of first antenna patches 520 may be arranged in a row in the horizontal direction, and may be arranged in a plurality of rows in the vertical direction Z.

The plurality of second antenna patches 530 may be arranged in a row in the horizontal direction, and may be arranged in a plurality of rows in the vertical direction Z.

When the plurality of first antenna patches 520 are in two rows, and the plurality of second antenna patches 530 are in two rows, the first antenna patch 520 disposed at the rightmost side of the plurality of first antenna patches 520 and the second antenna patches 530 disposed at the leftmost side of the plurality of first antenna patches 520 may be spaced apart from each other in the left and right direction Y.

The first antenna patch 520 may be the same as the first antenna patch 304 illustrated in FIG. 3, and the second antenna patch 530 may be the same as the second antenna patch 314 illustrated in FIG. 3. As illustrated in FIG. 6, the plurality of first antenna patches 520 and the plurality of second antenna patches 530 may be disposed to be distributed to the left and right sides on one substrate 510.

Each of the dipole antenna 540 and the monopole antenna 550 may be provided in plurality on the substrate 510.

The plurality of dipole antennas 540 and the plurality of monopole antennas 550 may be disposed closer to the edge of the center and the edge of the substrate 510.

Each of the plurality of dipole antennas 540 and the plurality of monopole antennas 550 may be disposed to be distributed on a left edge area, a lower edge area, and a right edge area of the substrate 510.

FIG. 7 is a view illustrating a fourth example of the display device according to this embodiment.

A display device of this embodiment may include an antenna module 600.

The antenna module 600 may include: a substrate 610; a plurality of first antenna patches 620; a plurality of first antenna patches 630; a dipole antenna 640; and a monopole antenna 650, and the plurality of first antenna patches 620 and the plurality of second antenna patches 630 may be spaced apart from each other in the vertical direction Z.

The substrate 610 may be assembled to be vertically disposed on the display device.

An example of the substrate 610 may have a horizontal length of 50 mm or less and a vertical length of 20 mm or less.

The plurality of first antenna patches 620 and the plurality of second antenna patches 630 may be disposed together on one surface of the substrate 610. When the substrate 610 is vertically disposed, the plurality of first antenna patches 620 and the plurality of second antenna patches 630 may be disposed on a front surface of the substrate 610.

The first antenna patch 620 and the second antenna patch 630 may be disposed together on a central area of the substrate 610. The first antenna patch 620 may be the same as the first antenna patch 310 illustrated in FIG. 3, and the second antenna patch 630 may be the same as the second antenna patch 320 illustrated in FIG. 3.

An example of the antenna module 600 may be a vertically stacked antenna module in which the first antenna patch 620 and the second antenna patch 630 are stacked in the vertical direction Z. A height of each of the plurality of first antenna patches 620 may be higher than that of each of the plurality of second antenna patches 430. The plurality of first antenna patches 620 may be upper antenna patches arranged in a row in the horizontal direction above the central area of the substrate 610. In addition, the plurality of first antenna patches 620 may be lower antenna patches arranged in a row in the horizontal direction below the central area of the substrate 610.

Another example of the antenna module 600 may be a vertical distributed antenna module in which the first antenna patch 620 and the second antenna patch 630 are vertically distributed and stacked. Another example of the antenna module 600 may include upper row patches and lower row patches. The upper row patches may be disposed in a row in the horizontal direction. The upper row patches may be disposed above the central area of the substrate 610. The lower row patches may be arranged horizontally in a row below the upper row patches. The lower row patches may be disposed on a lower portion of the central area of the substrate 610. The plurality of first antenna patches 620 and the plurality of second antenna patches 630 may be distributed to the central area of the substrate 610 in the vertical direction. Some of the plurality of first antenna patches 620 may constitute a portion of the upper row patches, and the rest of the plurality of first antenna patches 620 may constitute a portion of the lower row patches. In addition, some of the plurality of second antenna patches 630 may constitute a remaining portion of the upper row patches, and the rest of the plurality of second antenna patches 630 may constitute a remaining portion of the lower row patches.

Each of the dipole antenna 640 and the monopole antenna 650 may be provided in plurality on the substrate 610.

The dipole antenna 640 and the monopole antenna 650 may be disposed closer to a center of an edge and at the edge of the substrate 610.

The dipole antenna 640 and the monopole antenna 650 may be disposed to be distributed to the left edge area, the lower edge area, and the right edge area of the substrate 610.

FIG. 8 is a perspective view illustrating a fifth example of the display device according to this embodiment.

A display device of this embodiment may include an antenna module 700.

The antenna module 700 may include: a substrate 710; a plurality of first antenna patches 720; a plurality of first antenna patches 730; a dipole antenna 740; and a monopole antenna 750, and the substrate 710 may be assembled to be horizontally disposed on the display device.

The antenna module 700 may be a horizontally assembled module in which the substrate 710 is horizontally disposed.

For example, the substrate 710 may have a horizontal length of 200 mm or more and a vertical length of 3 mm or less.

The plurality of first antenna patches 720; and the plurality of first antenna patches 730 may be spaced apart from each other in a forward and backward direction or may be spaced apart from each of other in the left and right direction.

For example, any one group of a group of the plurality of first antenna patches 720; and a group of the plurality of first antenna patches 730 may be a front antenna patch group disposed close to a front end of the front end and a rear end of the substrate 710, and the other group may be a rear end antenna patch group disposed close to the rear end of the front end and the rear end of the board 710.

For example, any one group of a group of the plurality of first antenna patches 720; and a group of the plurality of first antenna patches 730 may be a left antenna patch group disposed close to a left end of the left end and a right end of the substrate 710, and the other group may be a right end antenna patch group disposed close to the right end of the left end and the right end of the board 710.

The first antenna patch 720 may be the same as the first antenna patch 310 illustrated in FIG. 3, and the second antenna patch 730 may be the same as the second antenna patch 320 illustrated in FIG. 3.

The plurality of first antenna patches 720 and the plurality of second antenna patches 730 may be disposed together on one surface of the substrate 710. When the substrate 710 is horizontally disposed, the plurality of first antenna patches 720 and the plurality of second antenna patches 730 may be disposed together on a front surface of the substrate 610.

Each of the dipole antenna 740 and the monopole antenna 750 may be provided in plurality on the substrate 710.

The dipole antenna 740 and the monopole antenna 750 may be disposed closer to a center of an edge and at the edge of the substrate 710.

For example, each of the dipole antenna 740 and the monopole antenna 750 may be disposed to be distributed to a left edge area, a front edge area, and a right edge area of the substrate 710.

As another example, each of the dipole antenna 740 and the monopole antenna 750 may be disposed to be distributed to the left edge area, a rear edge area, and the right edge area of the substrate 710.

FIG. 9 is a perspective view illustrating a sixth example of the display device according to this embodiment.

A display device of this embodiment may include an antenna module 800.

The antenna module 800 may include a substrate 810; a plurality of first antenna patches 820; a plurality of first antenna patches 830; a dipole antenna 840, and a monopole antenna 850, and an overall shape of the substrate 810 may be a three-dimensional shape rather than a planar shape.

The substrate 810 may include a main body 812, a first side body 814 disposed at one side of the main body 812, and a second side body 816 disposed at the other side of the main body 812.

The substrate 810 may be disposed perpendicular to the display device.

The substrate 810 may be a flexible PCB.

An example of the substrate 810 may have a horizontal length of 50 mm or less, a vertical length of 20 mm or less, and an overall thickness of 10 mm or less in a forward and backward direction.

The main body 812 may be disposed perpendicular to the display device.

The first side body 814 and the second side body 816 may be disposed perpendicular to the display device.

Each of the first side body 814 and the second side body 816 may be orthogonal to the main body 812. The first side body 814 and the second side body 816 may face each other. When the first side body 814 is a left body, the second side body 816 may be a right body, and conversely, when the first side body 814 is a right body, the second side body 816 is a left body.

The first side body 814 and the second side body 816 may extend forward from the main body 812 or backward from the main body 812.

The first antenna patch 820 may be the same as the first antenna patch 310 illustrated in FIG. 3, and the second antenna patch 830 may be the same as the second antenna patch 320 illustrated in FIG. 3.

The plurality of first antenna patches 820 and the plurality of first antenna patches 830 may be disposed together on one surface of the main body 812. When the main body 812 is vertically disposed, the plurality of first antenna patches 820 and the plurality of first antenna patches 830 may be disposed together on the front surface of the main body 812.

The plurality of first antenna patches 820 and the plurality of first antenna patches 830 may also be disposed on each of the first side body 814 and the second side body 816.

Each of the dipole antenna 840 and the monopole antenna 850 may be provided in plurality on the substrate 610.

The plurality of dipole antennas 840 and the plurality of monopole antennas 850 may be respectively disposed on the main body 812, the first side body 814, and the second side body 816.

FIG. 10 is a perspective view illustrating a seventh example of the display device according to this embodiment.

The display device may include a first antenna module 900 and a second antenna module 910, and at least one of the first antenna module 900 or the second antenna module 910 may be rotatably disposed in the display device.

Each of the antennas provided in the first antenna module 900 may have a horizontally polarized property. In the first antenna module 900, a plurality of first antenna patches 904 and a plurality of dipole antennas 906 may be disposed on a first substrate 902.

Each of the antennas provided in the second antenna module 910 may have a vertically polarized property. In the second antenna module 910, a plurality of second antenna patches 914 and a plurality of monopole antennas 916 may be disposed on the second substrate 912.

At least one of the first antenna module 900 or the second antenna module 910 may be a rotational module. The rotational module may rotate at an angle of 90° in a vertically disposed state and then may be disposed horizontally, or reversely rotate at an angle of 90° in a horizontally disposed state and then may be disposed vertically.

For example, both the first antenna module 900 and the second antenna module 910 may be rotational modules.

As another example, one of the first antenna module 900 and the second antenna module 910 may be a fixed module that does not rotate, and the other may be a rotational module.

An example of the rotational module may be rotatably connected to the display device by a hinge, and the rotational module may manually rotate by a user or operator.

As another example of the rotational module, a rotational shaft may be connected to the rotational module, and a rotation mechanism for rotating a rotation shaft may be disposed in the display device. The rotation mechanism may include a motor that rotates the rotating shaft.

When the display device includes the motor that rotates the rotation shaft connected to the rotational module, the MICOM 290 (see FIG. 2) may rotate the rotational module according to a signal to noise ratio (SNR).

The SNR may indicate a ratio of signal power to noise power.

The MICOM 290 may calculate the SNR by using power of a transmission signal received from the RF transmission module 150 of the A/V transmission device 100 by the rotational module and power of a noise signal contained in the transmission signal.

The SNR may be stored in the memory 250 of the display device 200.

If the SNR is less than a set value, the MICOM 290 may determine that a current reception rate of data received through the rotational module is low and may drive the motor of the rotation mechanism to rotate the rotational module to a position at which the data reception rate is high.

When the motor of the rotation mechanism is driven, the rotational module may rotate horizontally at a vertical position.

The above-disclosed subject matter is to be considered illustrative, and not restrictive, and the appended claims are intended to cover all such modifications, enhancements, and other embodiments, which fall within the true spirit and scope of the present invention.

Thus, the embodiment of the present invention is to be considered illustrative, and not restrictive, and the technical spirit of the present invention is not limited to the foregoing embodiment.

Therefore, the scope of the present invention is defined not by the detailed description of the invention but by the appended claims, and all differences within the scope will be construed as being included in the present invention.

The invention claimed is:

1. A display device comprising a display panel and further comprising:
   a first antenna module in which a plurality of first antenna patches and a plurality of dipole antennas are disposed on a first substrate and which is closer to one end of the display panel; and
   a second antenna module in which a plurality of second antenna patches and a plurality of monopole antennas are disposed on a second substrate and which is closer to an other end of the display panel,
   wherein the first antenna module and the second antenna module are disposed to be spaced a set distance from each other below the display panel in a left and right direction.

2. The display device according to claim 1, wherein the first antenna module and the second antenna module are vertically disposed below the display panel.

3. The display device according to claim 1, wherein the set distance is 70 mm or more and is less than a width of the display panel in the left and right direction.

4. A display device comprising:
   a substrate;
   a plurality of first antenna patches and a plurality of second antenna patches, which are disposed together on one surface of the substrate; and
   dipole and monopole antennas which are disposed at edges of the substrate toward a center of each respective edge.

5. The display device according to claim 4, wherein each of the plurality of first antenna patches has a height greater than a height of each of the plurality of second antenna patches.

6. The display device according to claim 4, wherein the plurality of first antenna patches and the plurality of second antenna patches are spaced apart from each other in a horizontal direction.

7. The display device according to claim 4, wherein the plurality of first antenna patches and the plurality of second antenna patches are disposed in a row in the horizontal direction, and
   the plurality of first antenna patches and the plurality of second antenna patches are spaced apart from each other in a vertical direction.

8. The display device according to claim 4, wherein the substrate is disposed vertically, and
   the plurality of first antenna patches and the plurality of second antenna patches are disposed on a front surface of the substrate.

9. The display device according to claim 4, wherein the substrate is disposed horizontally, and
   the plurality of first antenna patches and the plurality of second antenna patches are disposed on a bottom surface of the substrate.

10. A display device comprising:
    a substrate comprising a main body, a first side body disposed at one side of the main body, and a second side body disposed at the other side of the main body;
    a plurality of first antenna patches and a plurality of second antenna patches, which are disposed on one surface of the main body; and
    a dipole antenna and a monopole antenna, which are disposed on the substrate,
    wherein the dipole antenna and the monopole antenna are disposed on the main body and the first and second side bodies, respectively.

11. The display device according to claim 10, wherein the first side body and the second side body face each other.

12. The display device according to claim 10, wherein the substrate is a flexible PCB.

* * * * *